United States Patent
Leonard et al.

(10) Patent No.: US 12,163,563 B2
(45) Date of Patent: Dec. 10, 2024

(54) MULTI-DISC BRAKE HAVING RADIAL WEAR PIN CARTRIDGE AND INTEGRATED WATER JACKET

(71) Applicant: Ausco Products, Inc., Benton Harbor, MI (US)

(72) Inventors: Nancy Leonard, Dowagiac, MI (US); Brian Dennis, Kalamazoo, MI (US); Howard Baldeosingh, Stevensville, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 393 days.

(21) Appl. No.: 17/879,946

(22) Filed: Aug. 3, 2022

(65) Prior Publication Data

US 2023/0042558 A1  Feb. 9, 2023

Related U.S. Application Data

(60) Provisional application No. 63/229,128, filed on Aug. 4, 2021.

(51) Int. Cl.
| F16D 66/02 | (2006.01) |
| B60T 17/22 | (2006.01) |
| F16D 55/40 | (2006.01) |
| F16D 65/853 | (2006.01) |
| F16D 55/00 | (2006.01) |
| F16D 66/00 | (2006.01) |

(52) U.S. Cl.
CPC .......... *F16D 65/853* (2013.01); *B60T 17/221* (2013.01); *F16D 55/40* (2013.01); *F16D 66/02* (2013.01); *F16D 2055/0037* (2013.01); *F16D 2066/006* (2013.01)

(58) Field of Classification Search
CPC ........ F16D 65/853; F16D 55/40; F16D 66/02; F16D 2055/0037; F16D 2066/006; B60T 17/221
USPC ............. 188/71.5, 264 CC, 264 E, 170, 171; 192/18 A, 70.12, 113.1, 113.3, 192/113.34–113.36
See application file for complete search history.

(56) References Cited

U.S. PATENT DOCUMENTS

| 3,547,233 A * | 12/1970 | Girvan | F16D 65/72 188/170 |
| 4,262,789 A * | 4/1981 | Collins | F16D 25/123 192/85.49 |
| 4,921,078 A * | 5/1990 | Sommer | F16D 55/36 188/264 E |
| 6,029,782 A * | 2/2000 | Chojecki | F16D 55/40 188/71.6 |
| 8,662,277 B2 * | 3/2014 | Schoon | B60T 13/22 475/331 |
| 2023/0039313 A1 * | 2/2023 | Leonard | F16D 65/186 |

\* cited by examiner

*Primary Examiner* — Christopher P Schwartz
(74) *Attorney, Agent, or Firm* — Renner, Kenner, Greive, Bobak, Taylor & Weber

(57) ABSTRACT

A multi-disc brake is provided. The brake can include a radial wear pin cartridge for wear indication. The brake can include an integrated water jacket for cooling.

19 Claims, 9 Drawing Sheets

SECTION A-A

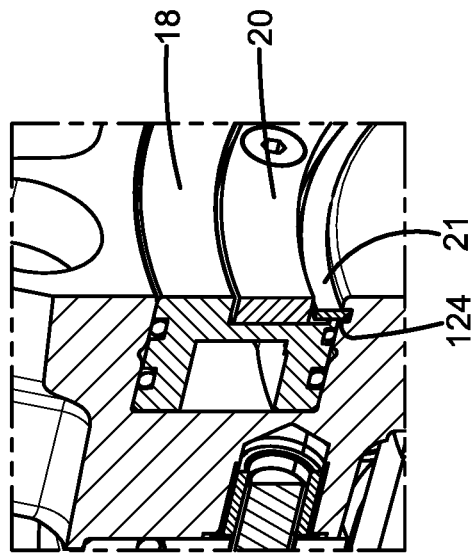
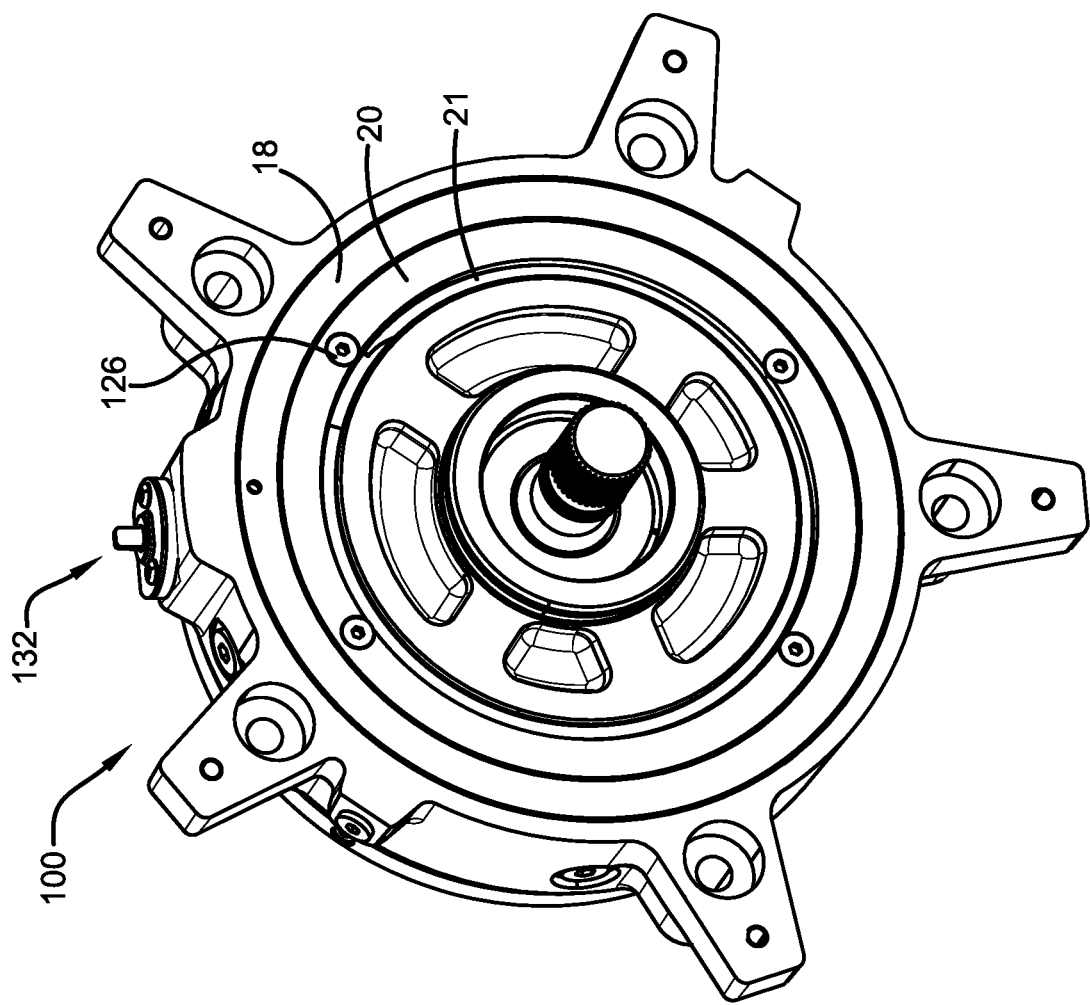
FIG. 5

FIG. 8  SECTION A-A

SECTION D-D

SECTION E-E

MULTI-DISC BRAKE HAVING RADIAL WEAR PIN CARTRIDGE AND INTEGRATED WATER JACKET

CROSS REFERENCE TO RELATED APPLICATIONS

This application claims the benefit of U.S. Provisional Application No. 63/229,128, filed Aug. 4, 2021, which is incorporated herein by reference.

TECHNICAL FIELD

This invention relates to a multi-disc brake. More particularly, this invention relates to a multi-disc brake that includes a radial wear pin cartridge for wear indication and an integrated water jacket for cooling.

BACKGROUND

Certain vehicles, such as LHD (load, haul, dump) machines, can be provided with a complete drive (i.e. an electric motor, brake, and gearbox). And this complete drive, especially certain particular designs thereof, can present unique challenges for the brake.

For example, the brake may be required to spin at a relatively higher speed (rpm) than in other vehicle drives. Since the electric motors of a complete drive are size constrained by the wheel, they produce less torque than the other drive packages. To compensate, a higher gear ratio might be utilized for the gearbox. This higher speed can then create brake issues relative to drag and heat generation.

A second challenge can be wear indication of the brake. Some brakes benefit from a wear indicator that allows one to assess the wear of the brake and address it as necessary. For example, most brakes in mining environments require some kind of wear indicator that allows easy preventative maintenance. The mine mechanic needs to be able to see whether the brake requires service, generally without disassembling the brake.

A conventional solution for wear indication is to place a pin attached to the brake disc stack. The tip of the wear pin sticks out of the brake face and is visible to the mechanic. As the brake wears, the pin either sticks farther in or out of the brake, depending upon the configuration. When the pin reaches some predefined position, the brake is deemed to need service. This axial wear pin configuration works well in cases where the front or rear of the brake is readily visible. In one conventional brake, the brake has the wear pin attached to the primary disc and as the brake approaches the wear-out condition, the pin will become flush with the face of the brake. Again, this orientation will only work if the end of the brake is visible to the operator to verify the pin position. In scenarios where the brake is sandwiched between a motor and gearbox, as is envisioned for the brake of embodiments of the present invention, the faces of the brake in the axial direction may be completely covered by the motor and gearbox, both of which may be substantially larger than the brake. The axial wear pin configuration will generally not work where the faces of the brake are covered in the axial direction.

Cooling is another challenge faced by certain brakes of a complete drive. Conventional cooling for certain brakes (e.g. certain mining brakes) can include hydraulic oil, flow-through cooling. Conventional systems might include the oil being pumped directly into the brake cavity where the rotating and stationary disc pack reside. As the vehicle stops, energy from the vehicle's motion is converted to heat by the disc stack. Oil is pumped into the cavity, through the disc stack, thereby absorbing the heat. The heated oil is then directed out of the brake to an external cooler.

In one example of a conventional brake, oil is pumped into the end of the brake shaft. Radial holes in the shaft direct the oil into and through the brake stack components. The oil exits the brake through a radial hole in the brake housing. It is then circulated to an oil cooler before returning to the brake. However, this conventional example is not desirable for certain relatively high rotation speeds. Flow-through cooling fills the brake sump 100% full of oil. As the discs rotate through the sump oil, the discs shear the oil, generating heat and causing horsepower loss. Said another way, as brake sump level increases, drag increases exponentially. A brake sump that is ⅓ full (typical for fixed sumps) generates only about 10% of the drag of a brake sump that is 100% full. In many applications, where a fixed sump cannot provide adequate cooling, the oil must be flowed through the brake to an external cooler. When oil is flowed through to a cooler, the brake fills up 100%, which results in very high heat generation and power loss.

Thus, there is a need for a brake that offers one or more improvements over the prior art, such as improved wear indication and improved cooling over known brakes.

SUMMARY OF THE INVENTION

It is thus an object of one aspect of the present invention to provide a multi-disc brake having a water jacket for cooling that does not fully fill the brake cavity such that the brake can operate with acceptable waste heat and power loss at high speed.

It is an object of another aspect of the present invention to provide a brake, as above, having a wear indicator adapted to detect wear from the outside diameter.

These and other objects of the present invention, as well as the advantages thereof over existing prior art forms, which will become apparent from the description to follow, are accomplished by the improvements hereinafter described and claimed.

In general, a brake includes a housing including a first housing portion and a second housing portion, a piston and braking assembly within a brake cavity of the housing, a water jacket within the first housing portion, wherein the water jacket is sealed and separate from the brake cavity, and an end cap plugging the water jacket, the end cap including a series of partial baffle and relief channel configurations, such that when water is provided within the water jacket, the water is capable of traveling around the partial baffles and through the relief channels to thereby remove heat from the first housing portion.

In accordance with another aspect of the invention, a brake includes a housing including a first housing portion and a second housing portion, a piston and braking assembly within a brake cavity of the housing, the piston and braking assembly including a service piston, a water jacket within the first housing portion, wherein the water jacket is sealed and separate from the brake cavity, and an end cap plugging the water jacket, the end cap including a communication port between an inlet of a service brake hydraulic circuit and the service piston.

In accordance with yet another aspect of the invention, a brake includes a housing including a first housing portion and a second housing portion, a piston and braking assembly within a brake cavity of the housing, a water jacket within the first housing portion, wherein the water jacket is sealed and separate from the brake cavity, and an end cap plugging the water jacket, the end cap including a pair of external O-rings and a pair of internal O-rings.

BRIEF DESCRIPTION OF THE DRAWINGS

FIG. 5 is rear perspective views of the brake, shown with the water jacket endcap of FIG. 3 in position with the brake.

DETAILED DESCRIPTION OF THE INVENTION

Figure 6:
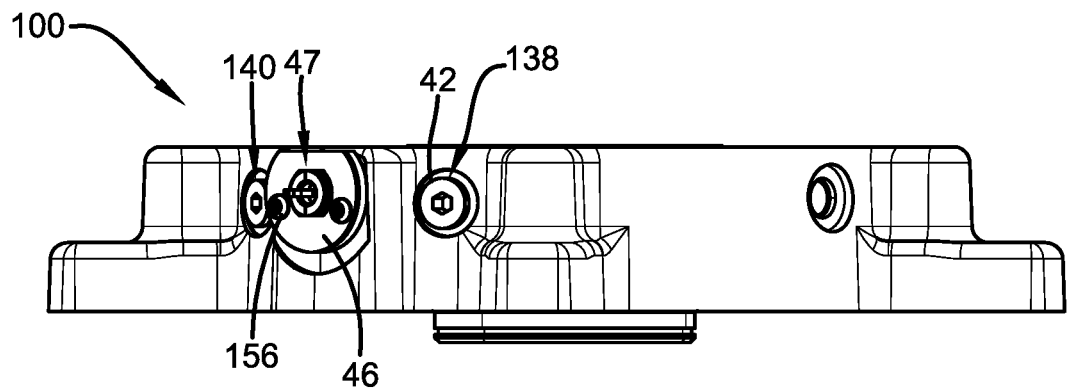
FIG. 6 is a side view of the brake.
Figure 7:
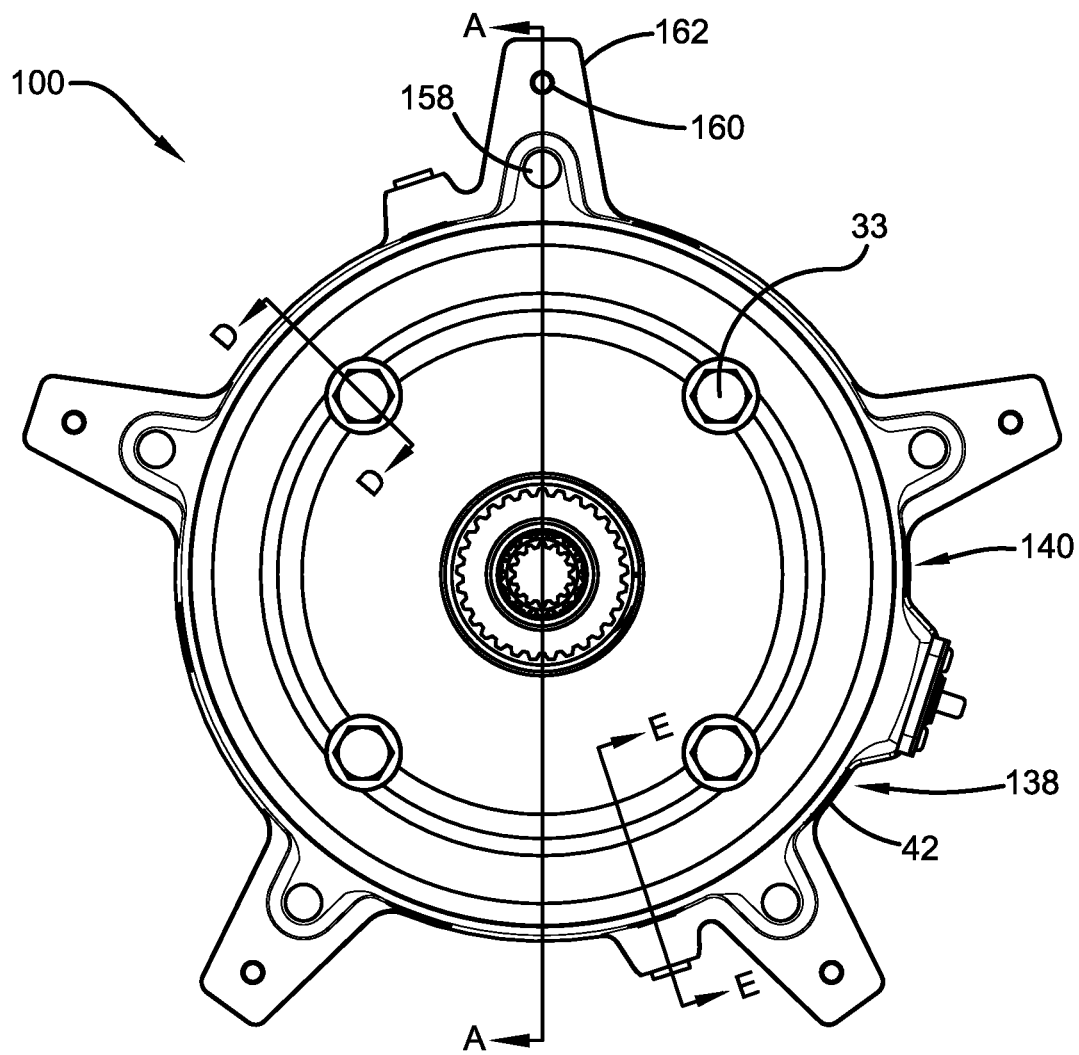
FIG. 7 is a front view of the brake.
Figure 8:
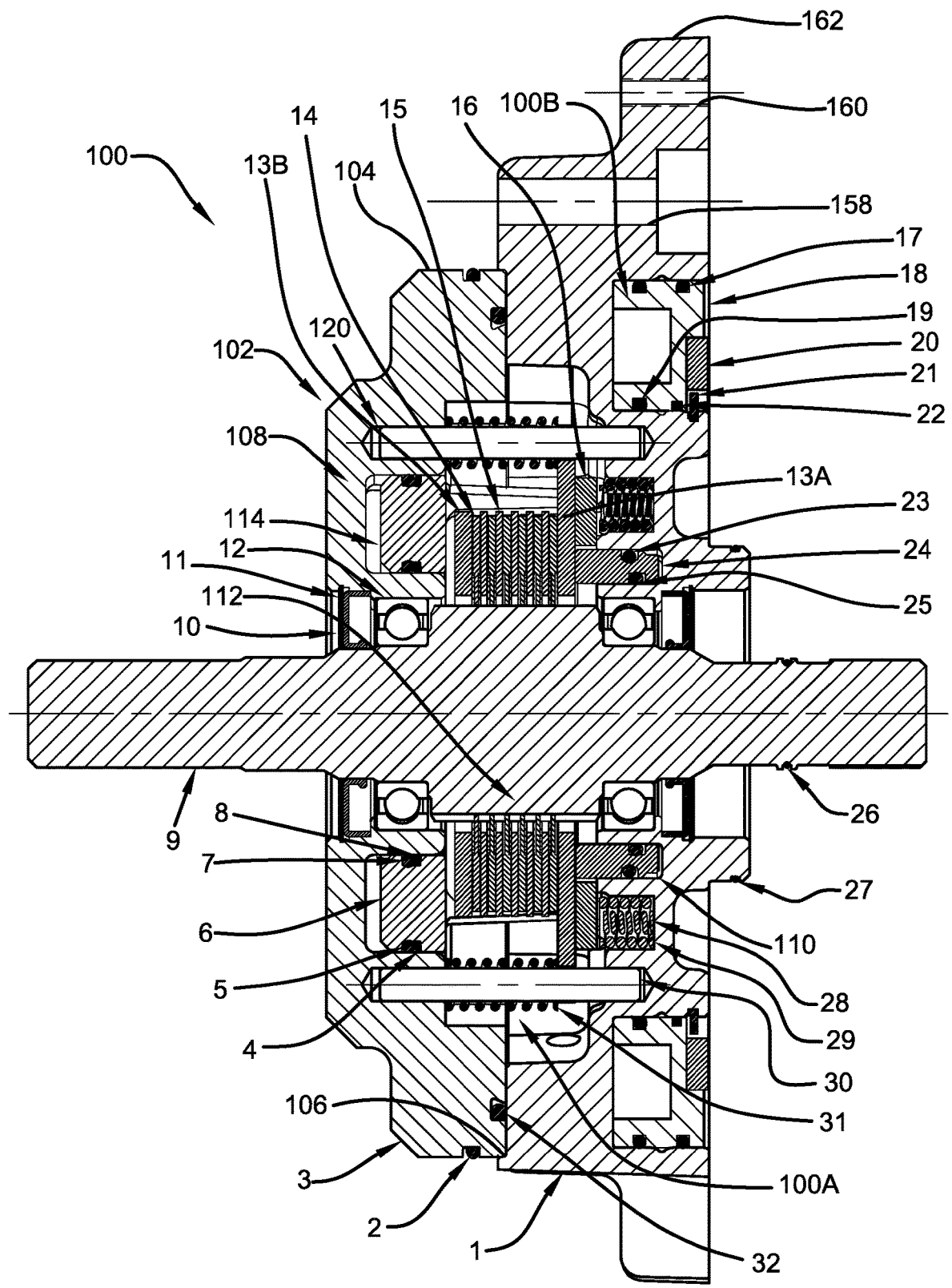
FIG. 8 is a sectional view of the brake about line A-A of FIG. 7.
Figure 9:
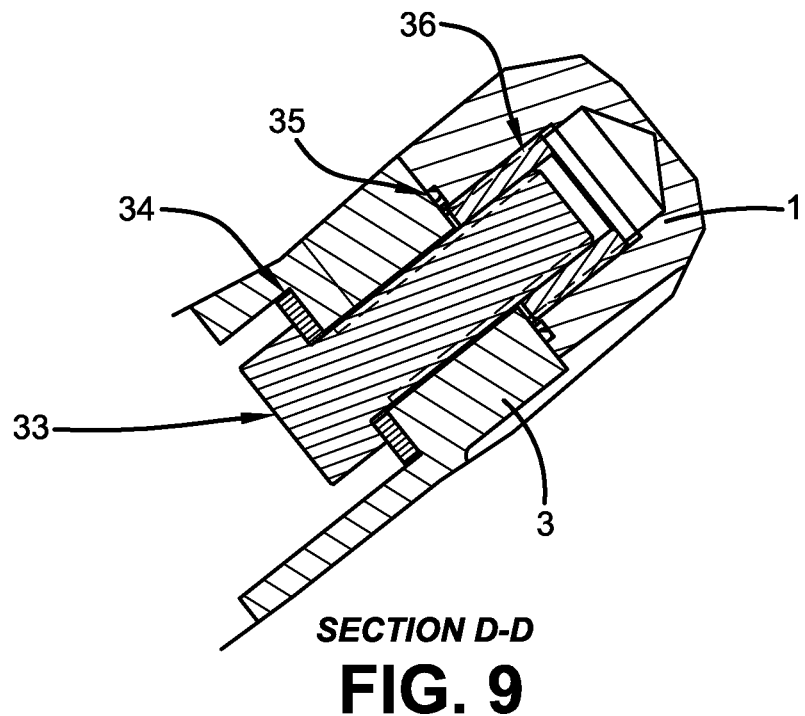
FIG. 9 is a sectional view about line D-D of FIG. 7, showing a mounting assembly of the brake.

With reference to FIGS. 1-12, a multi-disc brake according to the concepts of the present invention is generally indicated by the numeral 100. Multi-disc brake 100, which may be referred to as brake 100 or disc brake 100, includes a housing, generally indicated by the numeral 102 (FIG. 8), which carries and protects components of brake 100 and locates brake 100 in operative relation to other components of a vehicle. Housing 102 is formed from two main components—a first housing portion 1 that receives a portion of a second housing portion 3, which can also be described as a power plate 3. The two main housing components 1, 3 can be secured in respective position with each other using one or more fasteners 33, such as bolt 33 (FIGS. 7 and 9). As perhaps best seen in FIG. 8, an outer diameter 104 of second housing portion 3 partially fits within an inner portion 106 of first housing portion 1. In other embodiments, first housing portion 1 and second housing portion 3 can be aligned along with the use of dowels (not shown). As shown in FIG. 9, bolt 33 may be used in conjunction with one or more of a washer 34 under a head of the bolt 33, an O-ring 35 between second housing portion 3 and first housing portion 1, and a threaded insert 36 within first housing portion 1.

Housing 102 includes an internal piston and braking assembly 108, which includes a first piston 6 and a second piston 24. As will be further described below, brake 100 operates on two separate hydraulic circuits 110, 114 such that first piston 6 and second piston 24 are operated on by a respective one of the two separate hydraulic circuits 110, 114.

The first housing portion 1 of housing 102 should be fabricated from a material with high heat conductivity. Exemplary materials with high heat conductivity include aluminum, zinc, magnesium, and alloys thereof. The high heat conductivity of first housing portion 1 of housing 102 may be particularly advantageous for the service brake hydraulic circuit 110 of brake 100. As the rotating discs 14 spin, oil in a brake cavity 100A (i.e. a fixed sump thereof) within brake 100 is splashed against the first housing portion 1 of housing 102 (e.g. aluminum housing). Since the first housing portion 1 of housing 102 has high conductivity, first housing portion 1 can readily absorb and transfer some or most of the heat of the oil to an integral water jacket 1006 of housing 102, as will be discussed further below.

The second housing portion 3 of housing 102 has less need for heat transfer and therefore may be manufactured from a different material, such as ductile cast iron. The material (e.g. ductile cast iron) may be chosen for cost and other ease of manufacturing reasons.

Figure 4:
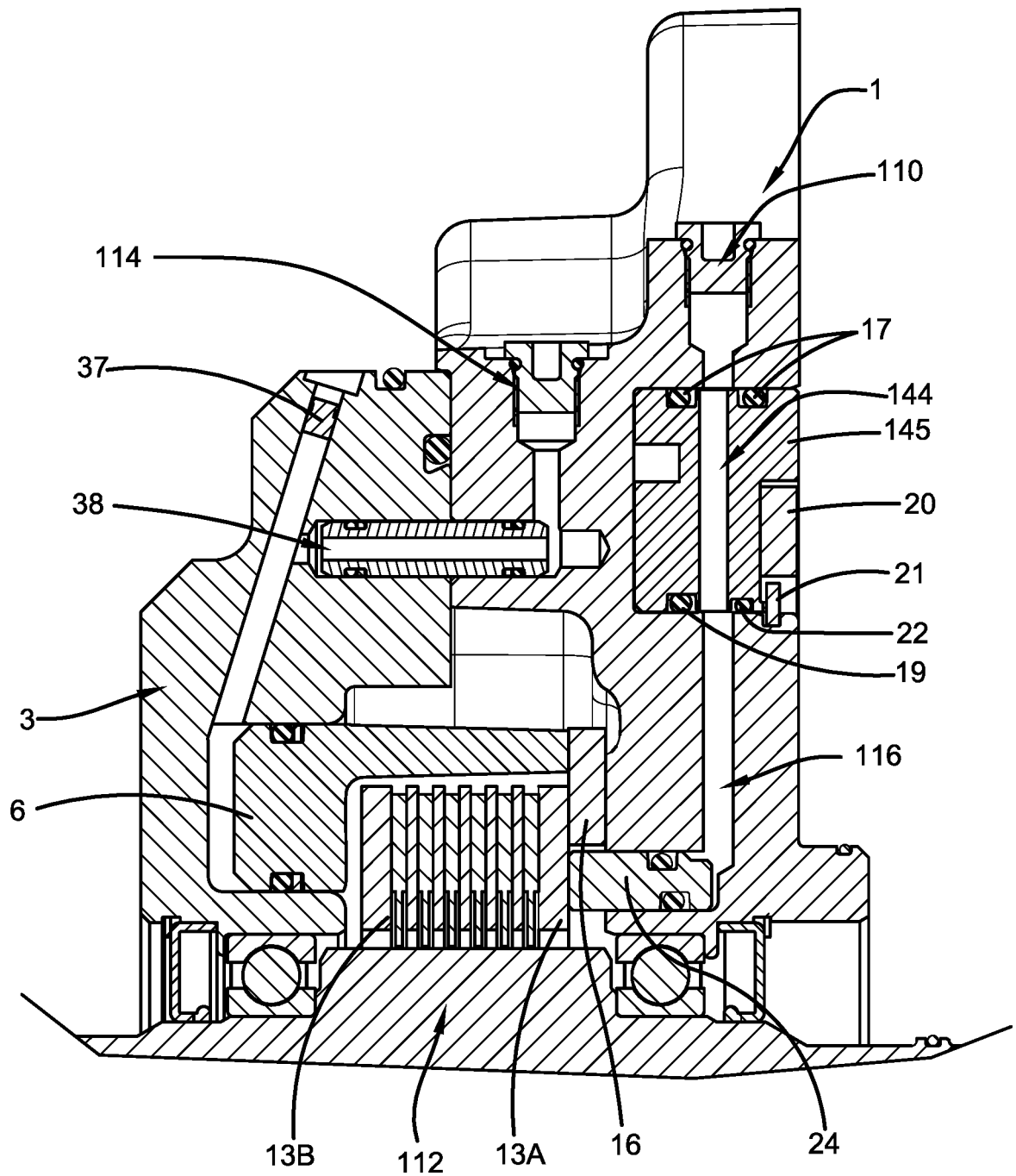
FIG. 4 is a perspective cutaway view of the brake showing the water jacket endcap of FIG. 3 in position with the brake.
Figure 11:
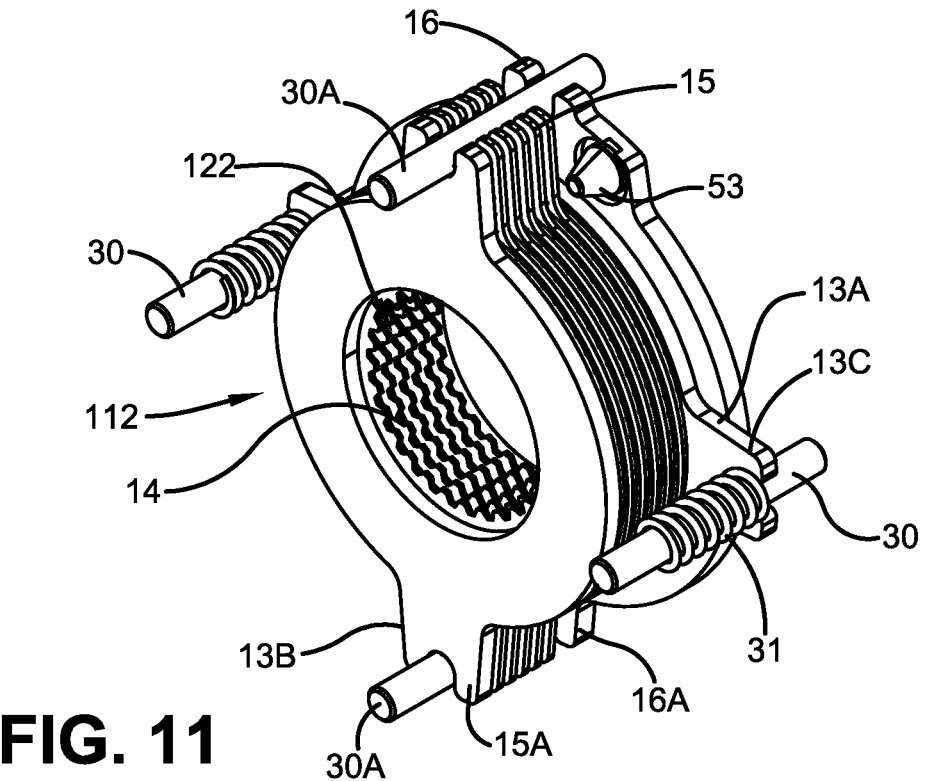
FIG. 11 is a perspective view showing a disc stack of the brake.
Figure 12:
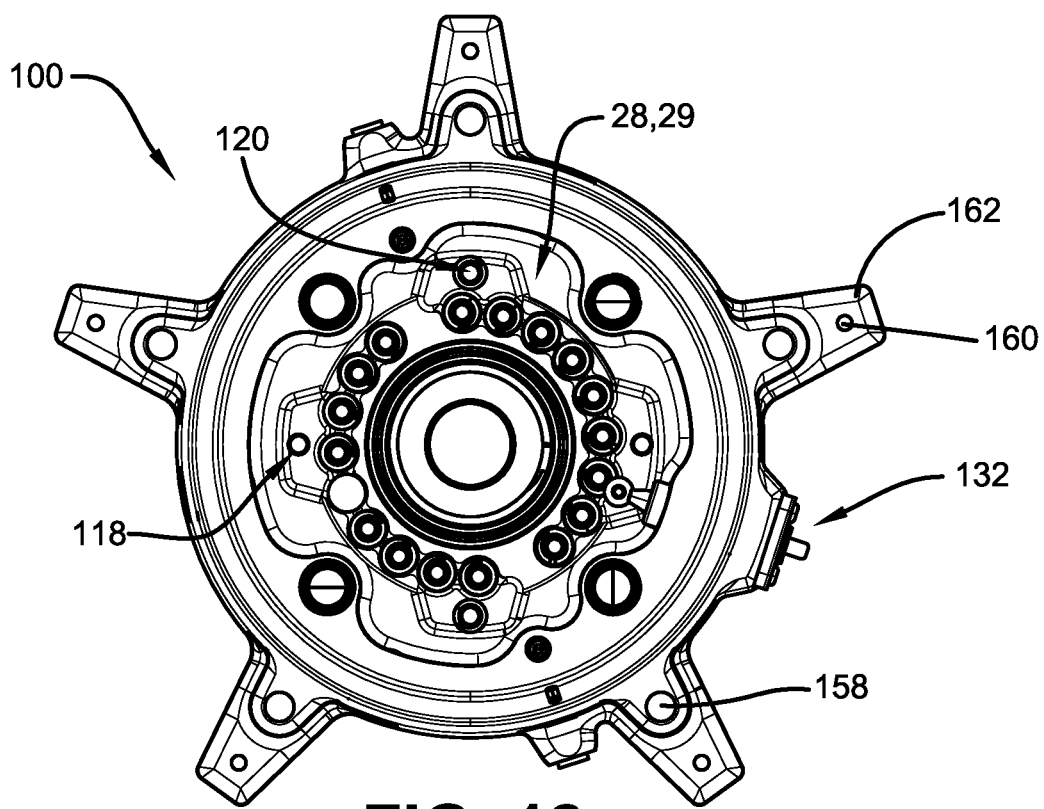
FIG. 12 is a cutaway view showing a spring orientation of the brake.

As best seen in FIGS. 4 and 8, the service brake hydraulic circuit 110 interacts with a service piston 24, which piston 24 is positioned within a piston bore of first housing portion 1. Piston 24 includes O-rings 23, 25 therearound to allow a small clearance while still preventing fluid from leaking past piston 24. Service piston 24 is near secondary disc 13A in order to push on secondary disc 13A in an operative configuration. As seen in FIGS. 8 and 11, secondary disc 13A is positioned between a primary disc 16 and a brake disc stack 112, which includes rotating discs 14 and stationary discs 15. As will be further described, the service brake hydraulic circuit 110 can operate independent of a parking brake hydraulic circuit 114.

In the operative configuration, and as perhaps best seen in FIG. 4 and FIG. 8, service brake hydraulic circuit 110 provides pressurized fluid to a housing port inlet location 116 behind service piston 24. Upon adding sufficient hydraulic fluid and pressure to service brake hydraulic circuit 110, the hydraulic fluid fluidly engages service piston 24 as to apply force against secondary disc 13A and thereby springs 31 around torque pins 30. The service piston 24 thereby pushes the secondary disc 13A into contact with the brake disc stack 112, pushing the disc stack 112 against a secondary disc 13B. Secondary disc 13B is pushed into contact with housing 3, such that the hydraulic force from service piston 24 compresses the interspersed rotating discs 14 and stationary discs 15 between secondary discs 13A and 13B, thereby creating the braking effect. When pressure is removed, the two springs 31 push the secondary disc 13A and service piston 24 back to the default positions to thereby release the service brake hydraulic circuit 110 and brake 100.

As further description of service brake hydraulic circuit 110, secondary disc 13A includes a respective ear 13C at and partially around each of the torque pins 30. The ears 13C are slidable about the torque pins 30 from the operative configuration to the default configuration. The torque pins 30 extend between torque pin holes 120 (FIG. 12) within each of second housing portion 3 and first housing portion 1.

As best seen in FIGS. 4 and 8, the parking brake hydraulic circuit 114 interacts with the parking piston 6. When hydraulic pressure is on, the parking piston 6 pushes against a primary disc 16 (FIG. 4) and springs 28, 29 (FIG. 8). The primary disc 16 is near, which may also be referred to as sitting on top of, a plurality of sets (e.g. seventeen sets) of inner springs 28 and outer springs 29. In the absence of the hydraulic pressure in the parking brake hydraulic circuit 114, the springs 28, 29 push the primary disc 16 into contact with the brake disc stack 112 (by way of secondary disc 13A), thereby causing the brake 10 to engage. This makes for automatic braking in the "default" position, such as when the vehicle is off. The overall brake 100 and hydraulic system also allow the operator of the vehicle to command the pressure to be released to engage the parking brake hydraulic circuit 114.

The primary disc 16 includes a respective ear 16A at and partially around each of torque pins 30A. The ears 16A are slidable about the torque pins 30A from the operative configuration to the default configuration. The torque pins 30A extend between torque pin holes 118 (FIG. 12) within each of second housing portion 3 and first housing portion 1.

Figure 10:
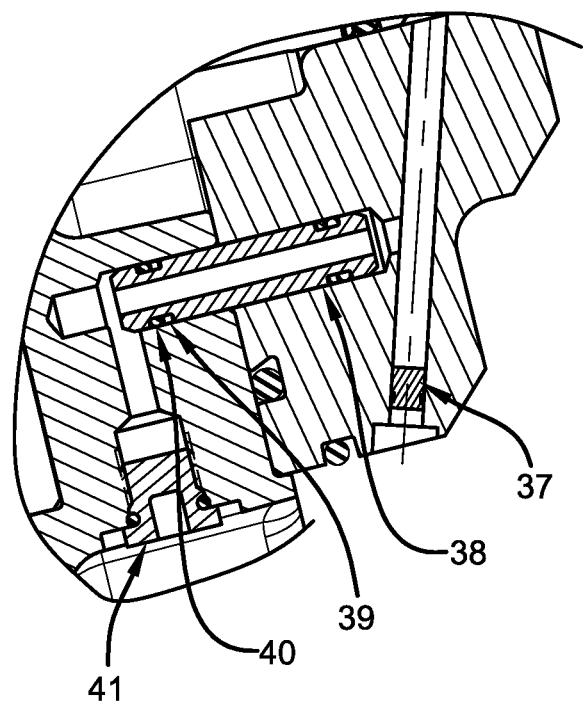
FIG. 10 is a sectional view about line E-E of FIG. 7, showing a hydraulic fluid supply network of the brake.

FIGS. 4 and 10 show porting for the parking brake hydraulic circuit 114. A crossover tube 38, which may also be referred to as a connector tube 38, connects hydraulics between second housing portion 3 and first housing portion 1. One or more combinations of O-ring 40 and backup ring 39 may be utilized with crossover tube 38 to allow a small clearance while still preventing fluid from leaking past this seal. Pin plug 37 and hex plug 41 may also be utilized with parking brake hydraulic circuit 114.

The engaging and releasing of disc stack 112 will now be further described. Disc stack 112 includes alternating stationary discs 15 and rotating discs 14. Rotating discs 14 are slidably mounted to a central, rotating shaft 9, which may also be referred to as a spline 9, such as by a spline and groove mechanism. For example, shaft 9 can include a ridge and groove configuration (not shown) that mates with a ridge and groove configuration 122 in rotating discs 14. Other techniques for driving discs 14 utilizing shaft 9 may also be known to those skilled in the art.

While rotating discs 14 are able to rotate with shaft 9, stationary discs 15 do not rotate with respect to brake 100. Each stationary disc 15 includes a respective ear 15A at and partially around each of the torque pins 30A. The ears 15A are slidable about the torque pins 30A from the operative configuration to the default configuration. But ears 15A being partially around each of the torque pins 30A prevents stationary discs 15 from rotating relative to brake 100.

When the disc stack 112 is engaged, the rotating discs 14 are clamped between the stationary discs 15, which prevents or slows the rotation of rotating discs 14. This friction in disc stack 112 resists the torque on the wheel of a vehicle.

Brake 100 operates as a wet brake on a fixed sump of oil in the brake cavity 100A, which may also be referred to as brake disc chamber 100A, that contains the rotating discs 14 and stationary discs 15. By controlling the level of oil in the sump, brake drag can be controlled to acceptable levels. However, in one or more embodiments, brake 100 may be sandwiched between a motor (not shown) and a gearbox (not shown). This creates a challenge for removing an acceptable amount of the heat generated during braking events. Both the motor and gearbox would generate their own heat, and there would be little path for heat transfer out of the brake cavity 100A to the environment.

As such, brake 100 includes a second cavity 100B, which may be referred to as a water cavity 100B or water jacket 100B, which is sealed and separate from the brake cavity 100A. Heat stored in the mass of the housing 102, especially first housing portion 1 thereof, can be removed by transferring the heat into water flowing through water jacket 100B. The water flowing through water jacket 100B may flow back to a cooler (not shown) to reject the heat before recirculation of the water. The water flow may be continuous.

One key to removing the heat is to get enough heat transfer from the housing 102 to the water. To accomplish this, an end cap 18 is provided that plugs the water jacket 100B. The end cap 18 is also preferentially made from a material with high heat conductivity (e.g. aluminum) for advantageous heat transfer.

The end cap 18 is held in place by a snap ring 21, which may also be referred to as a retaining ring 21, positioned in a groove 124 (FIG. 5). A plate 20, which may also be referred to as a retaining ring washer 20 or a snap ring plate 20, may be fastened to end cap 18, such as by fasteners 126 (e.g. screws 126) for preventing the snap ring 21 from coming out or bending out of its groove 124.

Figure 3:
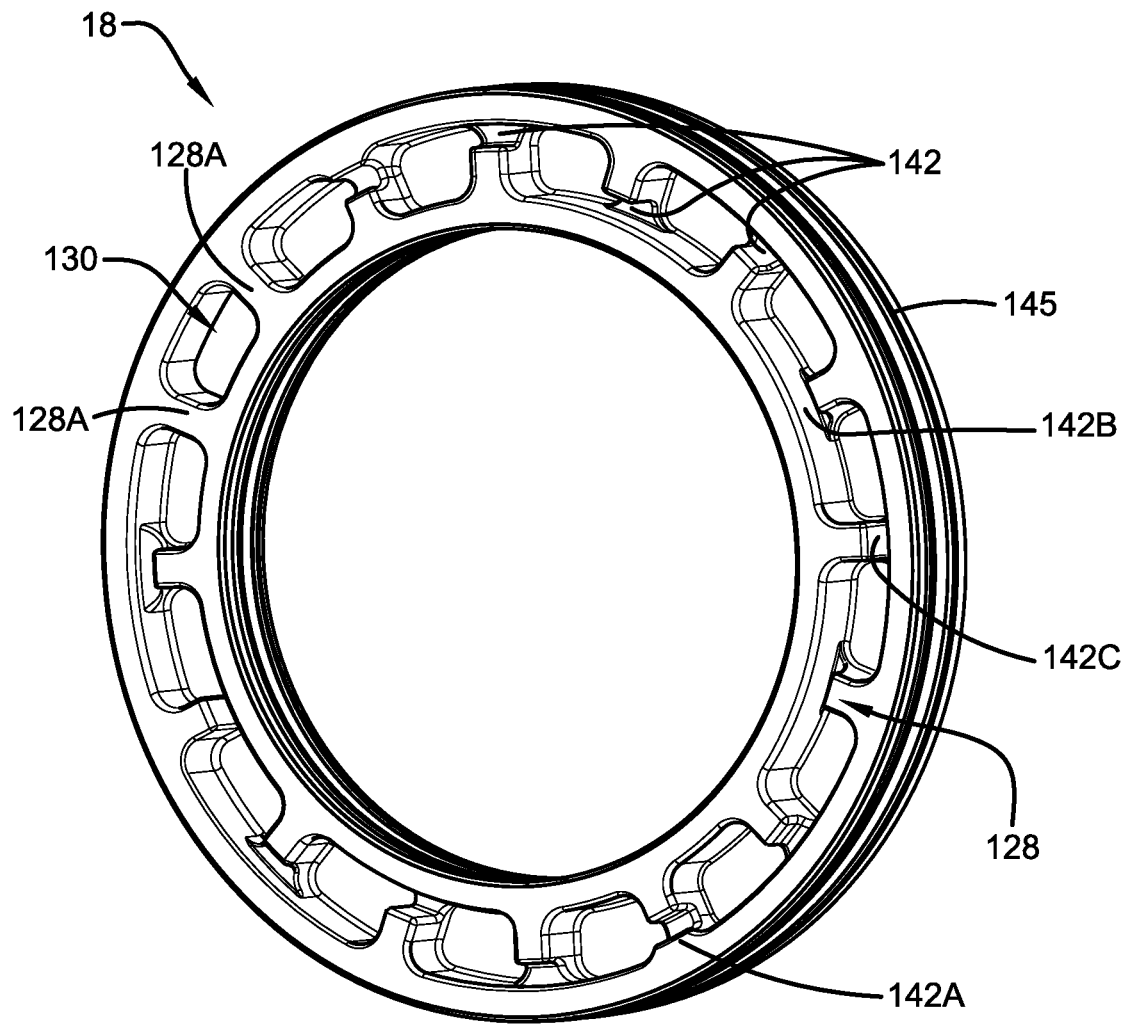
FIG. 3 is a perspective view of a water jacket endcap for use with the brake.

With reference to FIG. 3, the end cap 18 is designed with a series of baffles 128. The baffles 128 generally serve to increase turbulence and surface area between the water and the end cap 18, thereby increasing heat transfer. As further discussed below, the baffles 128 cause the water to change direction, which results in more turbulent flow, which generally serves to improve convective heat transfer.

Figure 1:
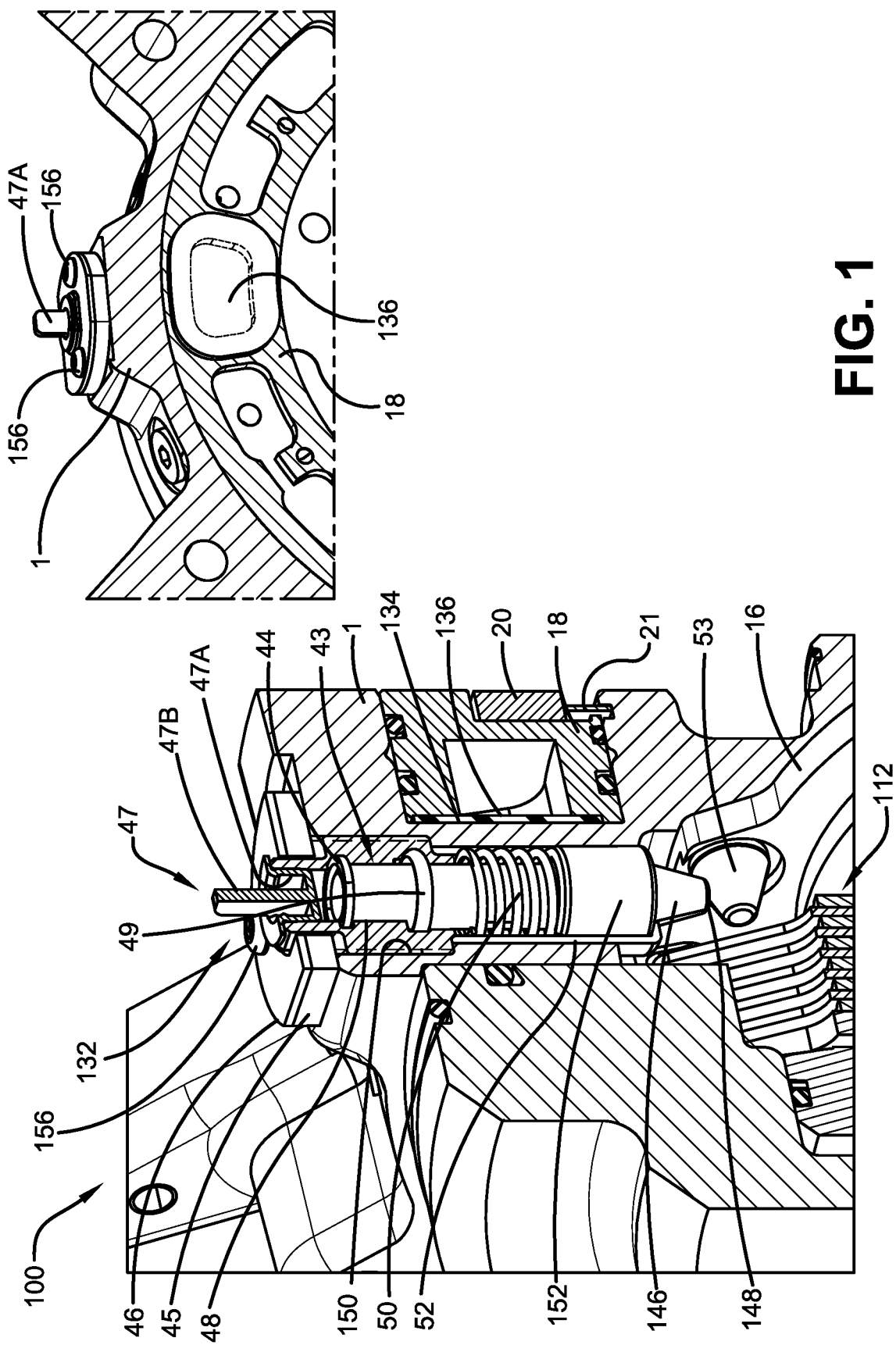
FIG. 1 is perspective cutaway views showing a pin cartridge assembly in a brake.
Figure 2:
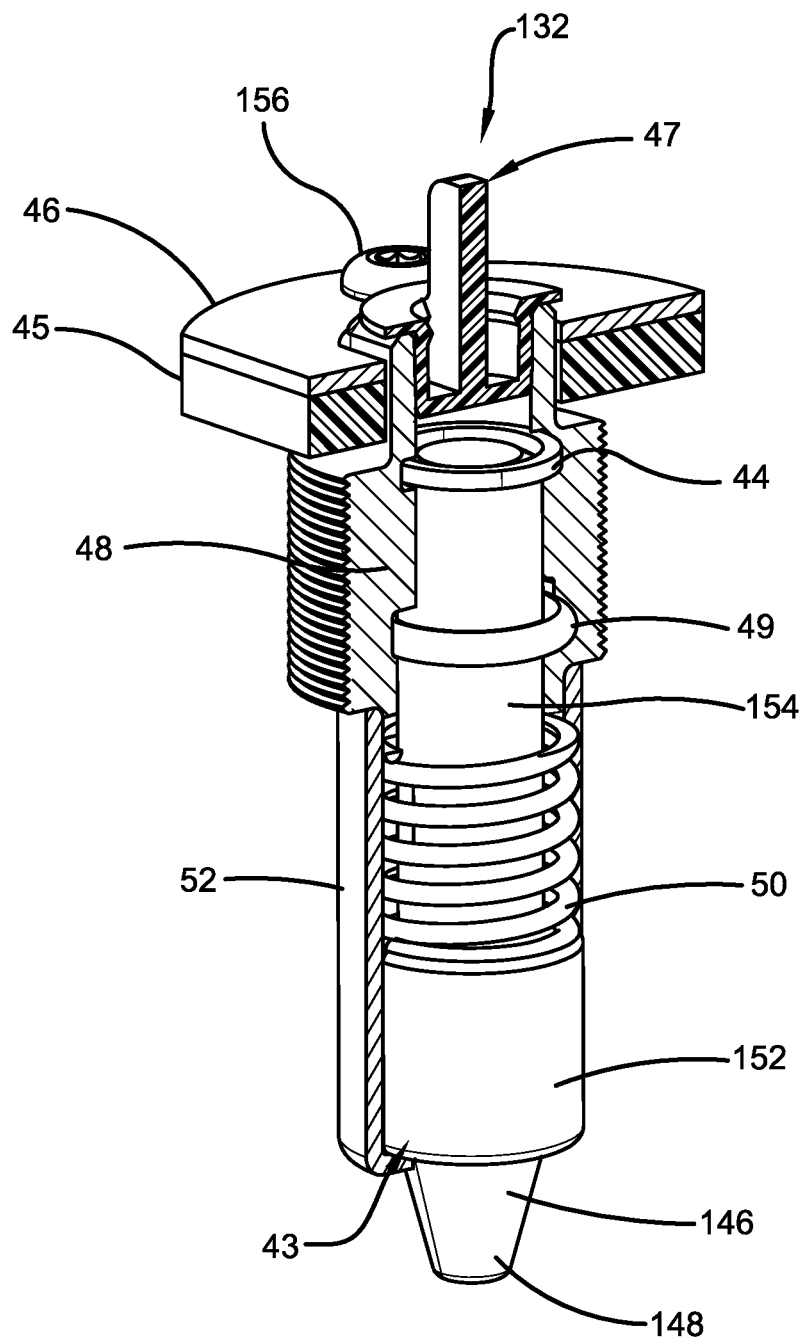
FIG. 2 is a perspective cutaway view of the pin cartridge assembly of FIG. 1, shown removed from the brake.

As seen in FIG. 3, one pair of baffles 128A completely block the water flow in an area 130 of a wear pin assembly 132 (FIGS. 1 and 2). That is, the water-blocking baffles 128A are positioned at the wear pin cartridge assembly 132 location. A recess 134 is formed (e.g. by milling) in the water cavity 100B in the first housing portion 1. The recess 134 holds a gasket 136. Said another way, gasket 136 is positioned between the end cap 18 and the first housing portion 1 in an area between water-blocking baffles 128A. The combination of the gasket 136 and the water-blocking baffles 128A forces the water to flow generally circumferentially around the brake 100 from a water inlet 138 to a water outlet 140 (FIGS. 6 and 7). Water inlet 138 and water outlet 140 may include respective hex plugs 42 for shipping purposes. The plugs 42 would be removed to connect cooling water lines in actual service (not shown).

The other baffles 128 along the water flow path are partial baffles such that they have respective relief channels 142 through which the water can flow. The relief channels 142 may be of a central configuration 142A, an inner configuration 142B, or an outer configuration 142C. In the central configuration 142A, the channel 142 is between two baffles 128 such that water flows between the two baffles 128. In the inner configuration 142 6, the channel 142 is positioned toward the inner perimeter of end cap 18 such that water flows more closely to the inner perimeter of end cap 18. In the outer configuration 142C, the channel 142 is positioned toward the outer perimeter of end cap 18 such that water flows more closely to the outer perimeter of end cap 18.

The various configurations 142A, 142B, 142C should be sufficiently staggered as to keep the water changing direction. It may be desirable to keep the water changing direction as much as possible to prevent laminar flow. That is, turbulent flow of the water is desired. The change of direction creates turbulence, which further increases heat transfer. As shown in FIG. 3, in one or more embodiments, each sequential configuration is a different configuration than the prior configuration. Though not shown in the Figures, in one or more embodiments, the central configuration 142A is not utilized, and the entire configurations are alternating between inner configuration 142B and outer configuration 142C.

Although baffles 128 are shown in the Figures with rounded edges, in one or more embodiments, one or more of the baffles 128 could include sharp edges to create additional turbulence, which may further improve heat transfer.

As shown in FIG. 4, end cap 18 includes a communication port 144, which may also be referred to as a hole 144 or wear pin radial hole 144, positioned between the inlet of service brake hydraulic circuit 110 and the service piston 24. The communication port 144 is through a body portion 145, which may also be referred to as a solid section 145, of the end cap 18. That is, communication port 144 may be described as being below the face of the water jacket 100B portion of end cap 18. Said another way, a portion of end cap 18 is in fluid communication with the water jacket 100B and the communication port 144 is not in fluid communication with the water jacket 100B. The communication port 144 can be formed radially through the body portion 145.

This communication port 144 solves a problem otherwise generally presented by the use of the end cap 18 relative to the overall configuration of brake 100. Specifically, without the communication port 144, the end cap 18 would block communication between the inlet port of service brake hydraulic circuit 110 the service piston 24. A hole and configuration (not shown) similar to communication port 144 should be utilized at an outlet location.

As can be seen in FIG. 4, the inlet port of service brake hydraulic circuit 110 comes in from the outside diameter, and the end cap 18 (i.e. if not for the presence of wear pin radial hole 144) directly blocks hydraulic flow to the service piston 24. To further accommodate this communication between the inlet port of service brake hydraulic circuit 110 the service piston 24, O-rings 17 and O-rings 19, 22 are placed on either side of the hole 144. The hole 144 is shown as being drilled radially through the end cap 18 plug between external O-rings 17 and internal O-rings 19, 22 to connect one side to the other. Said another way, the hole 144 extends radially from an axial position between the first pair of internal O-rings 19, 22 and to a position between the second pair of external O-rings 17. In other embodiments, other angular orientations may be utilized for hole 144, while still being able to perform the desired function. Said another way, hole 144 is shown as being aligned to the service brake hydraulic circuit 110 and the housing port inlet location 116, but hole 144 might be positioned elsewhere. There is radial clearance between the outer diameter and inner diameter of the end cap 18 and the respective surfaces on the housing 102. Thus, oil can flow generally circumferentially around the end cap 18 to 'find' the hole 144. The design is tolerant of various orientations of hole 144.

In one or more embodiments, the two O-rings 17 external of end cap 18 may be the same size or similar size as each other. Utilizing the two O-rings 17 of the same size or similar size generally serves to prevent high pressure in the service brake hydraulic circuit 110 from pushing against the snap ring 21 while also reducing unneeded load and required structure to support that load. In one or more embodiments, O-ring 19 and O-ring 22 internal of end cap 18 may be of the same or similar size as each other for the same reason of preventing service brake pressure from hydraulic circuit 110 from pushing the end cap 18 against snap ring 21. In one or more embodiments, the pair of external O-rings 17 may be the same size or similar size as the pair of internal O-rings 19, 22.

As suggested above, and as best seen in FIGS. 1 and 2, brake 100 further includes a wear pin assembly 132. The wear pin assembly 132 is located between the water jacket inlet 138 and outlet 140 ports on the outside diameter of the brake 100 and includes a wear pin cartridge 43, which may also be referred to as a wear pin 43. As will be further described, the wear pin cartridge 43 acts on (i.e. pushes) a wear pin guide 53, by way of spring force from a spring 50, which action occurs radially with respect to wear pin guide 53. Moreover, the travel of wear pin cartridge 43 is also radial relative to the brake 100.

Wear pin 43 includes a frustoconical nose 146, which may also be a conical nose in other embodiments. Wear pin 43 is slidably mounted inside wear pin assembly 132. Spring 50 pushes against a top surface, which may also be referred to as a first end, of a wider body portion 152 keeping wear pin nose 146 radially in contact with wear pin guide 53. Wear pin guide 53 can be either integral with or coupled with primary disc 16. Wear pin guide 53 can be either frustoconical or conical.

When the brake 100 is engaged from the released position to the operational position relative to the parking brake hydraulic circuit 114, primary disc 16 travels axially to close disc stack 112. As disc stack 112 wears, primary disc 16 travels axially farther to take up the additional clearance created by the wear. With primary disc 16 being integral with or coupled with wear pin guide 53, wear pin guide 53 likewise moves axially, and wear pin guide 53 likewise moves farther as the disc stack 112 wears. This allows the movement of the wear pin guide 53 to detect wear of the disc stack 112.

Since wear pin guide 53 is always in contact with wear pin nose 146, and since both wear pin guide 53 and wear pin nose 146 are frustoconical or conical in shape, axial movement of wear pin guide 53 causes radial movement of wear pin 43.

One challenge of this design is tolerance. The wear pin assembly 132 needs to compensate for the tolerance of the disc stack 112, plus the axial and radial location of the wear pin cartridge 43, plus the angular tolerance of the wear pin guide 53. To account for this, wear pin assembly 132 is provided with suitable structure for adjusting the wear pin cartridge 43 to a 'new condition' position, so that wear can be accurately measured regardless of tolerance.

More specifically, the wear pin assembly 132 contains an adjuster 48. Adjuster 48 generally acts as a tuner to set the wear pin cartridge 43 at an initial condition before wear. Adjuster 48 includes external threads, such that for setting the initial condition, adjuster 48 (and therefore the wear pin assembly 132) is screwed into a corresponding threaded portion 150 within first housing portion 1. This screw action continues until wear pin cartridge 43, which is movable or slidable relative to adjuster 148, starts to move based on distal end 148 contacting wear pin guide 53. This position of initial movement of wear pin cartridge 43 then sets the 'new condition' position of the wear pin cartridge 43 and wear pin assembly 132.

As further description of wear pin cartridge 43, wider body portion 152 is near (and relatively upward of) pin nose 146. Said another way, a second end of the wider body portion 152 carries pin nose 146. The outer perimeter of wider body portion engages a portion of spring cage 52. An end or upper portion of wider body portion 152 engages spring 50. Spring 50 is secured outwardly in place within spring cage 52 and is secured end-to-end in place between adjuster 48 and wider body portion 152. Spring cage 52 also surrounds a portion of adjuster 48 as to provide further capture for the spring 50 and wear pin cartridge 43.

Spring 50 is positioned around a narrower body portion 154 of wear pin cartridge 43. Narrower body portion 154 is near (and relatively upward of) wider body portion 152. A portion of narrower body portion 154 is within adjuster 48 and a portion of narrower body portion 154 is within spring cage 52. For the portion of narrower body portion 154 within adjuster 48, an O-ring 49 is positioned therearound to generally seal the brake disc chamber 100A from contamination and prevent leaks.

Turning back to setting the 'new condition' position of the wear pin cartridge 43 and wear pin assembly 132, once wear pin cartridge 43 and wear pin assembly 132 are tuned, a gasket 45, and a plate 46 can be secured to the first housing portion 1. This securement may be by way of fasteners 156, which may be screws or bolts. This securement of gasket 45 and plate 46 to first housing portion 1 secures the adjuster 48 in place and protects the wear pin cartridge 43 from contaminants and water intrusion. Exemplary materials for gasket 45 include rubber, cork rubber, and paper.

As shown in the FIGS., in one or more embodiments, gasket 45 and plate 46 have two holes to each receive a respective fastener 156. Alternatively, radial slots could be milled in gasket 45 and plate 46 to allow for the finer adjustments that may be needed to accommodate tolerance stack-ups.

At the outermost part of wear pin assembly 132 is a cap 47 which may be made of plastic or other suitable material. Cap 47 includes a body portion 47A that seals the bore in which wear pin cartridge 43 is positioned. Cap 47 includes a handle extension 47B extending from body portion 47A for particular grasping of handle extension 47B for removing cap 47. As suggested above, wear pin cartridge 43 will travel radially away from the center of brake 100 as brake 100 wears. This movement of wear pin cartridge 43 will eventually cover ring 44, which may also be referred to as a backup ring 44 or an indicator ring 44, which is nestled down inside the adjuster 48. For inspecting the condition of brake 100, the cap 47 can be removed to look for the position of wear pin cartridge 43 relative to ring 44. If the ring 44 cannot be observed, then it is generally time to repair brake 100, such as by replacing disc stack 112. Said another way, wear pin cartridge 43 will hide indicator ring 44 from view when it is time to repair brake 100. Ring 44 can be a bright or contrasting color, which can be relative to wear pin cartridge 43 and/or adjuster 48. An exemplary bright or contrasting color is white. Ring 44 can be made of polytetrafluoroethylene (e.g. Teflon™ from Chemours).

Brake 100 can be sized as to fit a number of applications and vehicle sizes. Brake 100 can also be characterized by the available hydraulic force and the predetermined spring force of the various springs. Though the hydraulic force and spring clamp force can each be adjusted to account for vehicle size, speed, and environment.

As suggested above, in one or more embodiments, the brake 100 may be mounted between an electric motor and gearbox. The brake 100 may assemble to the gear box with fasteners (not shown) (e.g. bolts) through counterbored holes 158. The bolts would be positioned into counterbored holes 158 in the first housing portion 1 and pass through first housing portion 1 to be threaded into the gearbox. The brake 100 would be mounted to the motor through different fasteners (not shown) (e.g. bolts) through threaded holes 160. These bolts would originate in the motor and fasten into the threaded holes 160 in ears 162. In one or more embodiments, five counterbored holes 158, five threaded holes 160, and five ears 162 may be utilized in a pentagram or 'starfish' pattern.

As shown in FIG. 8, other O-rings may be used in suitable locations. For example, O-ring 26 may be around spline 9, O-ring 2 may be around second housing portion 3, and O-ring 27 may be around first housing portion 1. These O-rings generally serve to provide suitable seals between these components and other components positioned proximate these components.

It is thus evident that a brake constructed as described herein accomplishes the objects of the present invention and otherwise substantially improves the art.

What is claimed is:

1. A brake comprising
   a housing including a first housing portion and a second housing portion,
   a piston and braking assembly within a brake cavity of the housing,
   a water jacket within the first housing portion, wherein the water jacket is sealed and separate from the brake cavity, and
   an end cap plugging the water jacket,
   the end cap including a series of partial baffle and relief channel configurations, such that when water is provided within the water jacket, the water is capable of traveling around the partial baffles and through the relief channels to thereby remove heat from the first housing portion.

2. The brake of claim 1, wherein the series of partial baffle and relief channel configurations are of a central configuration with water flowing between two partial baffles, an inner configuration with water flowing near an inner perimeter of the end cap, or an outer configuration with water flowing near an outer perimeter of the end cap.

3. The brake of claim 2, wherein the series of partial baffle and relief channel configurations includes at least one of the central configuration, at least one of the inner configuration, and at least one of the outer configuration.

4. The brake of claim 3, wherein the series of partial baffle and relief channel configurations includes two of the central configurations, with a remainder of the series of partial baffle and relief channel configurations being either the inner configuration or the outer configuration.

5. The brake of claim 1, wherein the water is provided, the end cap further comprising a pair of blocking baffles that completely block flow of the water in an area of a wear pin assembly, wherein a gasket is positioned between the end cap and the first housing portion in an area between the pair of blocking baffles, such that the combination of the gasket and the blocking baffles force the water to flow generally circumferentially from a water inlet to a water outlet.

6. The brake of claim 1, wherein the water is provided and wherein the water is in continuous flow.

7. The brake of claim 1, wherein the first housing portion is made from a material with high heat conductivity.

8. The brake of claim 7, wherein the material with high heat conductivity is selected from aluminum, zinc, magnesium, and alloys thereof.

9. The brake of claim 1, wherein the end cap is made from a material with high heat conductivity.

10. The brake of claim 9, wherein the material with high heat conductivity is selected from aluminum, zinc, magnesium, and alloys thereof.

11. The brake of claim 1, wherein the first housing portion includes a groove carrying a snap ring retaining the end cap in place.

12. The brake of claim 11, further comprising a snap ring plate securing the snap ring into the groove, the snap ring plate being fastened to the end cap by a plurality of fasteners.

13. A brake comprising
   a housing including a first housing portion and a second housing portion,
   a piston and braking assembly within a brake cavity of the housing, the piston and braking assembly including a service piston, a water jacket within the first housing portion, wherein the water jacket is sealed and separate from the brake cavity, and an end cap plugging the water jacket, the end cap including a communication port between an inlet of a service brake hydraulic circuit and the service piston.

14. The brake of claim 13, wherein the communication port is formed radially within the end cap.

15. The brake of claim 14, the end cap further comprising a first pair of internal O-rings and a second pair of external O-rings, wherein the communication port extends radially from an axial position between the first pair of internal O-rings and to a position between the second pair of external O-rings.

16. A brake comprising a housing including a first housing portion and a second housing portion, a piston and braking assembly within a brake cavity of the housing, a water jacket within the first housing portion, wherein the water jacket is sealed and separate from the brake cavity, and an end cap plugging the water jacket, the end cap including a pair of external O-rings and a pair of internal O-rings.

17. The brake of claim 16, wherein the pair of external O-rings are similarly sized.

18. The brake of claim 16, wherein the pair of internal O-rings are similarly sized.

19. The brake of claim 16, wherein the pair of external O-rings and the pair of internal O-rings are a same size.

* * * * *